United States Patent [19]

Lowrance, II et al.

[11] Patent Number: 5,382,405
[45] Date of Patent: Jan. 17, 1995

[54] METHOD OF MANUFACTURING A SHAPED ARTICLE FROM A POWDERED PRECURSOR

[75] Inventors: Kenneth F. Lowrance, II, Lansing, Ill.; Eric C. Knorr, Crown Point, Ind.; William M. Goldberger, Columbus, Ohio; Daniel Boss, Grayslake; Doreen Edwards, Chicago, both of Ill.

[73] Assignee: Inland Steel Company, Chicago, Ill.

[21] Appl. No.: 117,213

[22] Filed: Sep. 3, 1993

[51] Int. Cl.⁶ .................... B22F 3/14; H05B 7/20
[52] U.S. Cl. ........................ 505/125; 264/27;
419/10; 419/12; 419/13; 419/14; 419/15;
419/16; 419/23; 419/25; 419/29; 419/30;
419/32; 419/35; 419/45; 419/48; 75/228;
505/490; 505/491
[58] Field of Search ............... 419/10, 12, 13, 14,
419/15, 16, 23, 25, 29, 30, 32, 35, 45, 48, 49;
264/27; 475/405.2; 75/228; 505/1

[56] References Cited

U.S. PATENT DOCUMENTS

| | | | |
|---|---|---|---|
| 3,726,643 | 4/1973 | Merzanhov et al. | 423/409 |
| 4,161,152 | 7/1979 | Merzanhov et al. | 423/440 |
| 4,431,448 | 2/1984 | Merzanhov et al. | 75/238 |
| 4,446,242 | 5/1984 | Holt | 501/96 |
| 4,459,363 | 7/1984 | Holt | 501/96 |
| 4,560,409 | 12/1985 | Goldberger et al. | 75/130 R |
| 4,732,556 | 3/1988 | Chiang et al. | 425/405.2 |
| 4,853,178 | 8/1989 | Oslin | 419/23 |
| 4,933,140 | 6/1990 | Oslin | 419/23 |
| 4,946,643 | 8/1990 | Dunmead et al. | 419/12 |
| 5,198,188 | 3/1993 | Holt et al. | 419/45 |
| 5,246,638 | 9/1993 | Goldberger | 264/27 |
| 5,256,368 | 10/1993 | Oden et al. | 419/10 |
| 5,294,382 | 3/1994 | Goldberger | 264/27 |

OTHER PUBLICATIONS

P. H. Shingu, *New Ceramics (Japan)*, 2, 85 (1992).
W. L. Frankhouser, "Advanced Processing of Ceramic Compounds", Noyes Data Corporation, Park Ridge, N.J. (1987), pp. 44–62, 72–74, 111–149, and 182–186.
William A. Goldberger, "Electroconsolidation Rapidly Densifies Powder Preforms", *Advanced Materials and Processes*, vol. 141, No. 6, Jun., 1992.

*Primary Examiner*—Donald P. Walsh
*Assistant Examiner*—John N. Greaves
*Attorney, Agent, or Firm*—Marshall, O'Toole, Gerstein, Murray & Borun

[57] ABSTRACT

A method of manufacturing a shaped article from a powdered precursor, wherein the components of the powdered precursor are subjected to a self-propagating high-temperature synthesis (SHS) reaction and are consolidated essentially simultaneously. The shaped article requires essentially no machining after manufacture.

29 Claims, 1 Drawing Sheet

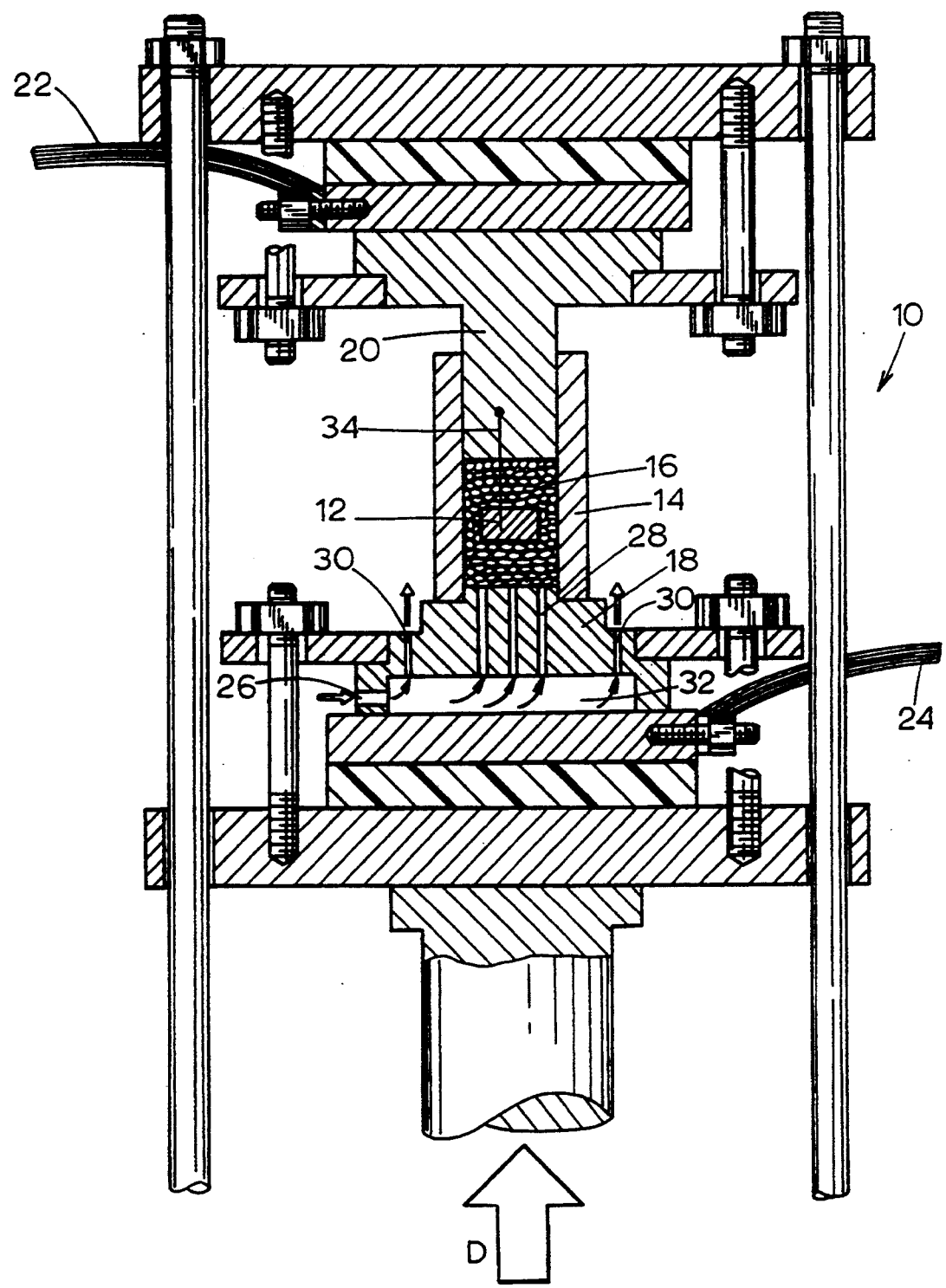

METHOD OF MANUFACTURING A SHAPED ARTICLE FROM A POWDERED PRECURSOR

FIELD OF THE INVENTION

The present invention is directed generally to a method of manufacturing a shaped article from a powdered precursor, and more particularly to a method wherein the powdered precursor, comprising components capable of undergoing a self-propagating high-temperature synthesis reaction (SHS), is shaped into a preform, then the preform is subjected to a SHS reaction and is consolidated, essentially simultaneously, to provide a densified shaped article.

BACKGROUND OF THE INVENTION

Conventionally, a shaped article, such as a shaped metallic article, is manufactured by melting a metallic or intermetallic compound, then casting the molten compound to form a shaped metallic article. The shaped metallic article typically is machined to provide the final product.

However, many intermetallic compounds, like metallic aluminides, have such high melting points that melting and casting the intermetallic compound into a shaped article is difficult to impossible. Other intermetallic compounds, like those containing beryllium, are very toxic in the powdered and molten forms, and therefore melting and casting such intermetallic compounds typically is avoided.

In addition, many intermetallic compounds are extremely hard. Shaped articles manufactured from such hard intermetallic compounds are very difficult to machine into intricate shapes. Therefore, shaped articles manufactured from high melting and/or extremely hard intermetallic compounds either are not available or are very expensive.

For example, a shaped article manufactured from a metallic aluminide can withstand very high operating temperatures. Therefore, a turbine blade made of a metallic aluminide would be useful in jet engines and would have improved performance characteristics in comparison to a present turbine blade comprising a titanium-nickel superalloy. However, metallic aluminides have very high melting points. Therefore, simply melting, casting and machining a metallic aluminide into the shape of a turbine blade is not practical.

Problems also exist in the manufacture of a dense shaped article from a ceramic or related material that is difficult to fabricate and machine by conventional techniques. The borides, carbides, niobiates, tantalates, oxide superconductors, chalcogenides, nitrides and silicides are examples of such difficult to fabricate and machine materials. Other related materials that are difficult to manufacture into intricately-shaped articles by conventional techniques include a cermet, which is a ceramic compound within a metallic matrix, like TiC/Ni (titanium carbide in nickel), and a ceramic/-ceramic microcomposite, like $Al_2O_3$ in $B_4C$ (alumina in boron carbide).

Another problem encountered in the traditional methods of manufacturing and machining an intermetallic compound, a ceramic or a related material is proper phase formation. Often multiple phases of such materials are formed after manufacture and during cooling of the material. The formation of multiple phases is not acceptable in many materials, such as electronic materials, like iron tantalates, iron lead niobiates and yttrium barium copper oxide superconductors. It therefore would be desirable to provide a shaped article having uniform phase formation.

It would be advantageous to overcome the above-identified problems and provide a method of manufacturing an intricately-shaped article that does not rely on standard casting and machining techniques. Investigators therefore sought alternative methods of manufacturing shaped articles from advanced materials, such as metallic aluminides. SHS reaction technology has been investigated as one method of manufacturing shaped articles from materials that are difficult to melt, cast or machine, or that require formation of a uniform phase.

SHS reaction technology is based on the synthesis of an intermetallic compound, a ceramic or related material directly from elements and/or components comprising the intermetallic compound ceramic or related material. In general, an SHS reaction is highly exothermic. Therefore, after initiating an SHS reaction, the heat energy released by the SHS reaction raises the temperature of the adjacent reactant materials, i.e., the elements and/or components comprising the intermetallic compound, ceramic or related material, to a sufficient level to propagate the SHS reaction and to complete the SHS reaction.

In a typical SHS reaction, the elements present in the reaction product, or other suitable starting materials, are intimately admixed in a predetermined proportion to form a powdered precursor. For example, if the final composition is nickel aluminide, elemental nickel and elemental aluminum, in finely divided form, are admixed in the proper proportion to provide the desired nickel aluminide. An SHS reaction does not require an element as a starting reactant material however. SHS reactions have been performed, for example, between an element and an oxide. Specifically, a yttrium copper barium oxide $Y_3CuBaO_x$) superconductor has been prepared by subjecting barium peroxide ($BaO_2$), copper (Cu) and yttrium oxide ($Y_2O_3$) to an SHS reaction.

The powdered precursor then is pressed into a preform of predetermined final shape. The SHS reaction then is initiated at one surface or edge of the preform, for example, by heating a surface of the preform until the activation temperature of the reaction is reached. Heating of the preform usually is accomplished by contacting a surface of the preform with a flame, a resistively-heated tungsten or Nichrome wire or a laser, or by igniting a solid state chemical ignitor.

The SHS reaction releases a sufficient amount of energy to initiate the reaction of adjacent reactant material. Accordingly, a reaction front, or zone, having a temperature up to about 4000° C. progresses from the heated surface or edge throughout the preform. An SHS reaction therefore is analogous to the travel of a flame front through a long fuse, but an energy front, as opposed to a flame front, is present in an SHS reaction. In an SHS reaction, a high temperature wave passes through the preform to convert the reactant material of the preform into an intermetallic compound, a ceramic or a related material that is difficult to fabricate and machine by conventional techniques.

The synthesis of a material that is difficult to fabricate and machine, like a carbide, a boride, a silicide, a chalcogenide, a nitride, a niobiate, a tantalate, an oxide superconductor or an intermetallic compound, like nickel aluminide, by means of an SHS reaction is known. For example, Merzhanov et al. U.S. Pat. No. 3,726,643 discloses a method of producing a refractory inorganic compound from a Group IV, Group V or Group VI metal and a nonmetal, like carbon or nitrogen, by an SHS reaction.

Merzhanov et al. U.S. Pat. No. 4,161,152 discloses a method of preparing titanium carbide (TiC) by subjecting elemental titanium and elemental carbon to an SHS reaction, wherein a gaseous by-product is generated during the SHS reaction and is vented through a porous casing. The method disclosed by Merzhanov et al. illustrates a major disadvantage associated with products of SHS reactions. The generation of a gaseous by-product due to contaminants in the starting materials causes the preform to expand during the SHS reaction, and thereby provide a reaction product of relatively low density that merely approximates the original shape of the preform. Therefore, in addition to an unacceptably low density, the reaction product of an SHS reaction also requires extensive machining to provide an article having the desired final shape.

Merzhanov et al. U.S. Pat. No. 4,431,448 discloses a tungsten-free alloy of titanium, boron and carbon having a porosity of less than 1%. The alloy is compressed and densified in a separate process step after an SHS reaction is completed. Patents disclosing the synthesis of refractory materials by means of an SHS reaction include Holt U.S. Pat. Nos. 4,446,242 and 4,459,363.

W. L. Frankhouser, in the publication "Advanced Processing Of Ceramic Compounds," Noyes Data Corporation (1987), at pages 55 and 56, discloses that investigators attempted to overcome the problem of low density SHS reaction products by compressing the preform during the SHS reaction with an inert gas. This technique provided reaction products having densities of 90% to 95% of theoretical maximum density by controlling the pressure applied to the preform and restricting volume growth of the preform. However, disadvantages still remained. For example, a high density product is achieved by applying pressure after the SHS reaction. The reaction product then typically required extensive machining to provide a desired final shaped article. As previously discussed, the hardness and high melting points of many SHS reaction products makes melting, casting and machining of the SHS reaction product into a final shaped article difficult.

Therefore, the majority of reaction products formed by an SHS reaction are highly porous and are not suitable for use in applications where high strength is required. The preform of the powdered precursor generally is compacted to about 60% to about 85% of theoretical density, and little or no shrinkage, or densification, occurs during the SHS reaction. In contrast, gas evolution during the SHS reaction typically reduces the density of the reaction product. Therefore, to provide a reaction product having a sufficiently high density for many practical applications, the SHS reaction product is subsequently densified, or consolidated.

The SHS reaction product is consolidated by a post-reaction processing step, such as for example hot pressing, hot isostatic pressing (HIP) or hot forging. A post-reaction processing step requires additional operations and equipment, and adds considerable cost to the manufacturing method. In the case of HIP processing, the post-reaction step also is disadvantageous because of the need to clad the reaction product and because the process step is slow and expensive. Therefore, there is only a marginal advantage to subjecting a preform to an SHS reaction to make a porous, intermediate article of approximate net shape, which subsequently must be densified by a post-reaction consolidation step versus the alternative method of comminuting an SHS reaction product into a powder, forming a preform from the reaction product powder, when consolidating the preform by a standard powder metallurgy procedures. Each alternative method includes additional process steps that are difficult to control and that are costly to perform. Investigators therefore have sought improved methods of manufacturing a shaped article having at least 80% of theoretical maximum density, wherein the shaped article is ready for use without additional process steps. Until the method of the present invention, these methods have not been realized.

It is known that the reaction product of an SHS reaction can be partially densified by controlling the temperature of the preform such that a molten phase develops at the reaction front during the SHS reaction. Moreover, if the temperature of the preform is controlled and pressure is applied during the SHS reaction, then a high density reaction product can be made by SHS reaction technology. However, the problem of manufacturing an intricately-shaped article by an SHS reaction, wherein the shaped article requires little or no subsequent densification or machining still exists.

William M. Goldberger, in *Advanced Materials & Processes*, Vol. 141, No. 6, June 1992, discloses a method of densifying a metallic or ceramic preform into an article of near net shape by a combination of heat and pressure. The method disclosed by Goldberger utilizes particles having a sufficient electrical conductivity and a sufficient fracture resistance to serve both as a pressure transmitting medium to apply pressure to a preform and, simultaneously, as a resistance heating medium heating and densifying the preform.

The process disclosed by Goldberger has been used to densify powdered alloys, mullire, alumina, neodymium-iron-boron magnet materials, silicon carbide and similar alloys and ceramics. In each case, the alloy or ceramics was synthesized prior to consolidation, or densification. These methods are disclosed in Oslin U.S. Pat. Nos. 4,853,178 and 4,933,140.

Accordingly, it would be desirable to provide a method of manufacturing a shaped article from a powdered precursor by simultaneously subjecting a preform of the powdered precursor to an SHS reaction and to consolidation conditions, such that the resulting shaped article is sufficiently dense for practical use and does not require post reaction processing, such as densifying, melting, casting or machining.

SUMMARY OF THE INVENTION

The present invention provides a simple and economical method of manufacturing a shaped article from a powdered precursor having a compositional makeup different from the shaped article. The powdered precursor comprises components capable of undergoing an SHS reaction, and typically comprises the elements present in the shaped article. The powdered precursor is subjected, simultaneously, to an SHS reaction and to consolidation to form a reaction product and provide a shaped article that: (1) does not require a post-reaction treatment to densify the article and (2) does not require additional post-reaction processing steps, like machining, prior to use.

More particularly, compounds, elements or a combination thereof, which are capable of undergoing an SHS reaction and providing the material of construction of the shaped article, are intimately admixed, as powders, to provide a powdered precursor. The powdered precursor then is shaped into a preform, wherein the preform essentially has the desired net shape of the shaped article.

Then, within a die chamber of an apparatus, the preform is positioned in a bed of electrically-conductive particles, like graphite, such that the electrically-conductive particles surround the preform. The preform and the bed of electrically-conductive particles within the die chamber then are: (1) pressurized to increase the density of the preform and a reaction product resulting therefrom, and (2) heated by resistively heating the electrically-conductive particles to a sufficient temperature to initiate an SHS reaction and convert the preform into a reaction product having the desired final shape. Typically, the shaped article is smaller in size than the preform because the preform has a density of about 30% to about 90% of theoretical maximum, whereas the shaped article has a density of 80% or greater than theoretical density. The shape of the preform therefore is designed to provide the desired net shape of the shaped article.

An SHS reaction and simultaneous consolidation provide a shaped article that is uniform in composition, is uniform in phase and is sufficiently dense for practical use. The components present in the preform have been converted into an intermetallic compound, a ceramic or a related material, like a cermet, by the SHS reaction. The shaped article therefore has a compositional makeup different from the preform, and also has the desired net final shape, thereby obviating post-reaction processing steps like consolidation, machining or casting. The elimination of casting and machining steps is very important for intermetallic compounds, ceramics and related materials that are too hard for easy machining and have too high of a melting point for easy casting.

The present method therefore overcomes severe problems associated with conventional methods of manufacturing a shaped article comprising a material: (1) that is hard and/or high melting and therefore is difficult to process, or (2) that can cool to provide a shaped article having multiple phases which adversely affect the desired properties of the shaped article. In accordance with the present invention, the shaped article is made directly from components capable of undergoing an SHS reaction in one rapid and economical process step.

In accordance with another important aspect of the present invention, the method affords production flexibility because articles having a different shape and a different material of construction can be manufactured in small production runs quickly and economically by changing only SHS reaction and consolidation conditions, such as temperature and pressure.

The method of the present invention can be used to manufacture an article of essentially any desired shape, either simple or complex, wherein the article comprises a material that can be manufactured by an SHS reaction. The method is especially useful in the manufacture of a hard, shaped article having a near theoretical maximum density.

The present invention also provides a method of manufacturing a shaped article from its elemental components by simultaneously subjecting the preform to an SHS reaction and compressing the preform, wherein the SHS reaction is initiated by resistively heating an electrically-conductive medium, like graphite, that surrounds the preform to a sufficient temperature to initiate the SHS reaction.

BRIEF DESCRIPTION OF THE DRAWINGS

The above and other aspects and advantages of the present invention will become apparent from the following detailed description of the present invention taken in conjunction with the drawing, wherein the sole figure is a full sectional view of a consolidating reactor useful in the method of the present invention.

DETAILED DESCRIPTION OF THE PREFERRED EMBODIMENT

The method of the present invention is illustrated by reference to the figure. In general, the compounds, elements or combinations thereof which are capable of undergoing an SHS reaction and providing the material of construction of the shaped article first are intimately admixed to form a powdered precursor. The powdered precursor then is shaped into a preform 12. Preform 12 essentially has the desired final shape of the shaped article. Preform 12 then is positioned within a die chamber 14 of consolidating reactor 10, such that preform 12 is surrounded by a bed of electrically-conductive, free flowing, granular material 16.

One or both of rams 18 and 20 are activated by a compression means to compress the bed of electrically-conductive material 16 and preform 12 in die chamber 14. Simultaneously, electric power is supplied to leads 22 and 24 using a power source (not shown) to heat the bed of electrically-conductive material 16 and preform 12 in die chamber 14.

The material comprising bed 16 is electrically conductive. Therefore, taking into consideration factors such as the volume and cross-sectional area of die chamber 14 and the electrical resistivity of the electrically-conductive material, a consolidating reactor 10 can be designed such that the electrically-conductive material is an electrical resistor element, and is heated by passing an electric current through the electrically-conductive material. Therefore, the electrically-conductive material can be heated to a sufficient temperature to initiate the SHS reaction. In another embodiment, a lead 34 penetrates through the bed of electrically-conductive material 16 to contact an edge, or preferably a surface, of preform 12. The SHS reaction is initiated at an edge or surface of preform 12 by resistively-heating lead 34. As will be discussed in greater detail hereinafter, preform 12 and bed of electrically-conductive material 16 can be positioned and arranged such that the bed of electrically-conductive material 16 initiates the SHS reaction at an edge or surface of preform 12, thereby obviating the presence of lead 34.

The temperature of preform 12 is raised sufficiently to initiate an SHS reaction and convert the components of preform 12 into the material comprising the shape article. The temperature of the exothermic SHS reaction can be controlled by introducing a coolant through port 26. The coolant controls the temperature of die chamber 14 by passing through cavity 32 and conduits 28. In an alternative embodiment to be discussed more fully hereinafter, a gas capable of reacting in an SHS reaction can be introduced into die chamber 14 by passing a gas stream through cavity 32, conduits 28, and vents 30. Exemplary gases include nitrogen or a halogen, which are capable of reacting with the components of preform 12 in an SHS reaction. In another alternative embodiment a vacuum is drawn through vent 30 to remove gaseous by-products of the SHS reaction from consolidating reactor 10. During the heating process and the SHS reaction, the bed of electrically-conductive material 16 and preform 12 are compressed by applying a sufficient force D in the direction of the arrow.

After the SHS reaction is completed, die chamber 14 is cooled, and a shaped article is removed from consolidating reactor 10. The shaped article is dense, has the desired final net shape, is uniform in phase, and does not require machining or other post-reaction process steps.

The following detailed description particularly sets forth a nonlimiting illustrative example wherein a method of manufacturing a shaped article comprising nickel aluminide is described. However, the method of the present invention also is useful in the manufacture of shaped articles comprising other intermetallic compounds, or a ceramic or other hard or high melting material, wherein the components comprising the preform are capable of undergoing an SHS reaction to provide the material of construction of the shaped article.

In particular, the figure is a full sectional view of a consolidating reactor 10 including a die chamber 14 and rams 18 and 20 for holding and compressing a preform 12 and a bed of electrically-conductive material 16. The material of construction of die chamber 14 and rams 18 and 20 is not particularly limited as long as preform 12 and the bed of electrically-conductive material 16 can be heated to a sufficient temperature to initiate and propagate an SHS reaction.

For example, a die chamber 14 manufactured from steel was used because steel has an excellent ability to withstand high pressure. However, preform 12 often could not be heated to a sufficient temperature to initiate an SHS reaction. The thermal properties of a steel die chamber were such that die chamber 14 was heated at the expense of preform 12 and the bed of electrically-conductive material 16. However, a steel die chamber 14 is not precluded from use in SHS reactions.

A die chamber 14 manufactured from graphite allowed preform 12 to attain a higher temperature, but the temperature was still insufficient to initiate an SHS reaction. However, wrapping a graphite die chamber with an insulating material, like mullire, allowed preform 12 to be heated to a sufficiently high temperature to initiate the SHS reaction. In particular, in the preparation of nickel aluminide from elemental nickel and elemental aluminum, a die chamber 14 constructed from graphite and wrapped with mullire heated preform 12 to about 700° C., thereby initiating the SHS reaction.

For similar reasons, rams 18 and 20 also preferably are constructed from graphite as opposed to steel. Rams 18 and 20 typically are subjected to temperatures of over 1000° C. Therefore, to protect the graphite rams from oxidation, rams 18 and 20, and the outer wall of die chamber 14, are coated with a boron nitride (BN) and silicon carbide (SiC) paint, and a stream of inert gas, like argon gas, is directed at the hottest portions of rams 18 and 20 to cool the rams. To further reduce heat damage to ram 20, a hollow graphite cylinder (not shown) can be slipped over ram 20.

In accordance with an important feature of the present invention, a bed of electrically-conductive material 16 is positioned in die chamber 14. The electrically-conductive material typically is a granular material having an electrical resistivity of about $2 \times 10^{-2}$ to about $20 \times 10^{-2}$ ohm-cm. The electrically-conductive material also has a sufficiently high melting point, i.e., 2000° C. or above, such that the electrically-conductive material remains a solid throughout the simultaneous SHS reaction and consolidation. Preferably, the electrically-conductive material comprises spheroidal graphite particles, having an average particle size diameter of about 50 μm (microns) to about 500 μm, and preferably a particle size diameter of about 75 μm to about 300 μm.

Graphite is a preferred electrically-conductive material because graphite does not melt and is relatively inert at the very high temperatures encountered during an SHS reaction. Graphite also can be compressed and deformed, then recover its initial shape when the pressure is relieved. The resilient graphite particles therefore resist breakage and can De used repeatedly. The property of resilience is an advantage because the electrically-conductive material then does not bond to the preform after the consolidation is completed, and releases from the preform when the pressure is relaxed. Preferred electrically-conductive materials have a resiliency of at least 20%, and preferably about 25% to about 45%, measured as the increase in volume of the electrically-conductive material after release of 10,000 psi (pounds per square inch) compaction pressure.

An exemplary electrically-conductive graphite material is graphite powder sold commercially as Superior Graphite 9400, available from Superior Graphite Co., Chicago, Illinois. Such graphite materials, and the electrically-conductive materials in general, are flowable, fracture-resistant, compressible, resilient and have a melting point of 2000° C. or greater. Graphite particles having spheroidal shape and an average particle size of about 50 μm to about 500 μm have the advantages of: (1) easily forming around edges and corners of preform 12 to distribute applied pressure evenly, (2) being sufficiently deformable such that the shape of the preform is not adversely affected, (3) being recyclable for reuse, (4) being non-adherent to a shaped article, and (5) being rapidly heated by electrical resistance heating.

Graphite particles however have a relatively low electrical resistivity of about $3.5 \times 10^{-2}$ to about $5 \times 10^{-2}$ ohm-cm. Therefore, a relatively high electrical current is required to achieve rapid heating of the preform. If a higher electrical resistivity is desired, the graphite particles can be mixed with other electrically-conductive materials (that also have a high melting point and are relatively inert) to increase the electrical resistance.

Therefore, numerous other electrically-conductive materials can be used in the method of the present invention. Other exemplary electrically-conductive materials having the above-described properties and that can be used in the method of the present invention include, but are not limited to, carbides, like silicon carbide and boron carbide; carbonitrides; borides; nitrides, like boron nitride; and mixtures thereof. These electrically-conductive materials can be used alone, in combination, or mixed with graphite to serve as the electrically-conductive pressure transmitting material.

In addition, a graphite material that is partially reacted with an element such as boron or silicon develops a hard surface coating on the graphite material. The surface coating increases the particle to particle contact resistance, and thereby the overall electrical resistivity while retaining the desirable resiliency of the graphite.

In particular, the electrical resistivity of the bed of electrically-conductive material 16 is dependent on the degree of particle-to-particle contact. Therefore, the resistivity of a bed of an electrically-conductive material 16 is strongly dependent on the applied pressure and on the size distribution of the electrically-conductive material because both parameters affect the degree of packing of the electrically-conductive material. Thus, the application of pressure on the bed of electrically-conductive material 16 increases the area of interparticle contact by compressing particles against each other. This is especially the case for softer, more resilient electrically-conductive materials, such as graphite.

The electrical resistivity of a bed of graphite particles is increased substantially by coating the surface of the graphite particles with a film that is harder than graphite. The film forming compounds are hard, high temperature stable compounds such has carbides, borides, nitrides, and related chemical compounds, such as carbonitrides.

Therefore, the electrical resistivity of graphite can be increased by reacting the graphite with selected elements, and preferably with elements that form high temperature stable carbides and carbonitrides on the carbon surface. Boron is a highly effective film-forming element in amounts of about 1.5 percent to about 5 percent by weight. Silicon carbide additions to graphite, up to about 30 percent by weight, yield materials having increased electrical resistivity. Methods used to coat the graphite include carbothermic reduction in an inert or nitrogen atmosphere or, by the chemical reaction of element-containing gases in the presence of the graphite particles.

Preform 12 is positioned in die chamber 14 and within a bed of electrically-conductive material 16 such that preform 12 is surrounded by electrically-conductive material. Preform 12 has been formed essentially into the desired shape of the shaped article, and has been compressed to a density of about 30% to about 90%, and preferably about 60% to about 75%, of the theoretical maximum density of the shaped article. At less than about 30% of the theoretical maximum density, preform 12 does not have sufficient structural integrity for further processing. With respect to the upper limit, compressing preform 12 to greater than 90% of the theoretical maximum density does not adversely affect preform 12. However, conventional cold pressing techniques presently have an practical upper limit of about 90% of the theoretical maximum density.

The pressure exerted by rams 18 and 20 during the SHS reaction provide a shaped article having a substantially identical shape to preform 12 and a density in excess of 80% of the theoretical maximum density of the shaped article. Typically, however, the shaped article is smaller than preform 12 because the shaped article is more dense. Preform 12 is designed to provide a shaped article of desired size after considering the material of construction of the shaped article, the components present in the preform, the pressure applied to the preform during the SHS reaction, the desired density of the shaped article, and similar process parameters.

The compositional makeup of preform 12 and the shaped article are different. The shaped article comprises an intermetallic compound, a ceramic, a cermet, a ceramic/ceramic microcomposite or a related material. Exemplary ceramics include, but are not limited, to borides, nitrides, carbides, niobiates, tantalates, oxide superconductors and silicides. Such materials often are hard or high melting materials, and therefore difficult to shape by conventional methods.

In contrast, preform 12 is a mixture of components capable of undergoing an SHS reaction and providing the material of construction of the shaped article. As an illustration, in the present example, the shaped article comprises nickel aluminide ($Ni_3Al$), whereas preform 12 comprises a homogenous mixture of aluminum metal and nickel metal, both as powders. The SHS reaction converts the elemental aluminum and elemental nickel components in preform 12 into a shaped article comprising an intermetallic compound ($Ni_3Al$).

Therefore, preform 12 is prepared by intimately admixing the correct proportions of components capable of undergoing an SHS reaction to provide the material of construction of the shaped article. In the illustrative example discussed herein, finely divided nickel powder (Ni) and aluminum powder (Al), in a 3 to 1 atomic ratio of Ni to Al, were admixed to provide a homogeneous powdered precursor. The mean particle diameter of the aluminum powder and nickel powder was 37 $\mu$m and 87 $\mu$m (microns), respectively. The mean particle diameter of a powdered component of preform 12 typically is about 0.1 to about 100 $\mu$m, and preferably about 1 to about 100 $\mu$m. To achieve the full advantage of the present invention, the mean particle diameter of a powdered component is about 5 to about 50 $\mu$m.

It also is preferred that the powdered components present in preform 12 have similar mean diameters. As will be explained more fully hereinafter, if the particle size of one component in preform 12 is too large (e.g., Ni), intermediate reaction products can form and hinder formation of the desired SHS reaction product. The shaped article then would comprise various nickel aluminides, unreacted aluminum metal and unreacted nickel metal. Such a shaped article would have different physical and chemical properties from a shaped article comprising essentially only the desired nickel aluminide ($Ni_3Al$).

An optimum particle size for each component, and the relative particle sizes for the components, can be determined by a person skilled in the art after considering the identity of the components of preform 12, the desired density of the shaped article and the compositional makeup of the shaped article. Typically, the ratio of mean particle diameters between any two components in preform 12 is about 0.1 to 1 to about 10 to 1. Preferably, the ratio of mean particle diameters is about 0.2 to 1 to about 5 to 1. To achieve the full advantage of the present invention, the ratio of mean particle diameter is about to 0.3 to 1 to about 3 to 1.

Although the illustrative example demonstrates the manufacture of nickel aluminide ($Ni_3Al$), the compositional makeup of the shaped article is not limited as long as the components in preform 12 can undergo an SHS reaction. Therefore, the present method can be used to manufacture a shaped article comprising an intermetallic compound (e.g., nickel aluminide), a ceramic, a cermet or any other material capable of manufacture by an SHS reaction.

Shaped articles comprising the following nonlimiting exemplary materials can be manufactured by the present method. Exemplary materials include, but are not limited to, borides, like titanium boride ($TiB_2$), zirconium boride ($ZrB_2$), iron boride, molybdenum boride, vanadium boride, or chromium boride; carbides, like titanium carbide (TiC) or boron carbide ($B_4C$); intermetallic compounds, usually aluminum and a transition metal, like nickel aluminides, titanium nickelides, iron aluminides, copper aluminides, titanium aluminides or cobalt aluminides; nitrides, like titanium nitride (TiN), tantalum nitride (TaN), silicon nitride ($Si_3N_4$), aluminum nitride (AlN) or boron nitride (BN); chalcogenides, like tellurides, phosphides, selenides or sulfides, such as tungsten diselenide or molybdenum disulfide; and silicides, like chromium silicide, molybdenum silicide, zirconium silicide, or titanium silicide. Shaped articles comprising such materials are useful in high temperature structural applications or as cutting tools. For example, the intermetallic aluminides are useful in high temperature structural applications because of their high strength and oxidation resistance.

In addition to a simple binary material like nickel aluminide, the method of the present invention also can provide a shaped article having a more complex compositional makeup, such as, for example, the ternary material titanium carbonitride (Ti(CN)). The method of the present invention also can provide a dense shaped article having a cermet composition (e.g., TiC in a Ni matrix, or WC (tungsten carbide) in a Ni matrix, prepared from W, C and Ni) or a ceramic/ceramic microcomposite (e.g., SiC and $Al_2O_3$ or SiC fibers homogeneously dispersed throughout a $Si_3N_4$ matrix). Such materials have been difficult to prepare by reaction bonding and hot pressing. In particular, the method of the present invention can be used to manufacture a shaped article comprising a molybdenum disilicide, a copper aluminide, TiCAlO, FePbNb, BN—$SiO_2$, SiAlON, BN—$TiB_2$, AlN—$TiB_2$, $Si_3N_4$—SiC—TN, or $Fe_2PbNbO_5$ from $Fe_2O_3$, $NbO_2$ and Pb. Such complex materials are very hard and are difficult to form into a shaped article by conventional techniques.

As illustrated above, a mixture of components capable of undergoing an SHS reaction often is a binary mixture of two elements wherein a transition metal is combined with boron, nitrogen, carbon, a chalcogenide element or silicon, or wherein two metallic elements, typically aluminum and a transition metal, are combined to form an intermetallic compound. Transition metals conventionally used in an SHS reaction include, but are not limited to, scandium, titanium, vanadium, chromium, manganese, iron, cobalt, nickel, zirconium, niobium, molybdenum, hafnium, tantalum, cerium, tungsten, neodymium, praseodymium, lanthanum, thorium and uranium. It is not necessary however that the mixture of components capable of undergoing an SHS reaction comprise only elements. An oxide, azide, halide, or other compound capable of participating in an SHS reaction an be included in the powdered precursor.

In another embodiment, the compounds comprising the powdered precursor are not admixed prior two forming preform 12. In this embodiment, a portion of a first component, such as elemental copper in a finely-divided form, first is added to the preform die. Then a gradually changing mixture of the first component and a second component, like elemental titanium, is added to the preform die such that the percentage of the first component in the mixture decreases and the percentage of the second component increases. Finally, a portion of only the second component is added to the preform die. Accordingly, after the SHS reaction and simultaneous consolidation, the compositional makeup of the shaped article is such that one surface comprises the first component, the opposite surface comprises the second component, and between the surfaces is a gradual compositional change from the first component to the second component. Such a shaped article is useful for applications wherein one surface of the shaped article is cooled (i.e., copper surface) and the opposite surface is heated (i.e., titanium surface).

In addition to solid components, preform 12 also can include a liquid or a gaseous component. For example, nitrogen can be included in preform 12, as a liquid or as a gas, and reacted with solid components present in preform 12 in an SHS reaction to form nitrides. In this embodiment, the solid components are admixed and compressed into preform 12, then preform 12 and nitrogen are introduced into die chamber 14. The gaseous or liquid nitrogen is homogeneously dispersed throughout preform 12. Compression of preform 12 by rams 18 and 20 maintains the nitrogen in intimate contact with preform 12 during the SHS reaction. Alternatively, nitrogen also can be generated during the SHS reaction by utilizing an azide as a component of preform 12.

In the illustrative example, after the elements (Al and Ni) comprising the powdered precursor are intimately admixed, the powdered precursor is compressed into preform 12. Preform 12 can be prepared by uniaxially pressing the powdered precursor in a cylindrical die at a pressure of about 10,000 to about 30,000 psi (pounds per square inch), and preferably about 15,000 to about 25,000 psi, to yield a preform having a desired predetermined shape. In the illustrative example wherein preform 12 comprises nickel and aluminum metal, cold uniaxial compression of the powdered precursor provides a preform 12 having an average density of about 4.4 $g/cm^3$ (grams per cubic centimeter). Preform 12 of the illustrative example therefore was compressed uniaxially to about 58% of the theoretical maximum density $Ni_3Al$, or to about 64.5% of the theoretical maximum density of a mixture of nickel and aluminum metal in a 3 to 1 atomic ratio.

Preferably, preform 12 is prepared by a cold, isostatic pressing of the powdered precursor at a pressure of about 40,000 to about 80,000 psi, and preferably at about 50,000 to about 60,000 psi. In the illustrative example, a powdered precursor including a 3 to 1 atomic ratio of nickel to aluminum was isostatically pressed at about 57,000 psi to yield preform 12 having an average density of about 6.3 $g/cm^3$. Preform 12 of the illustrative example therefore was isostatically compressed to about 84% of the theoretical maximum density of $Ni_3Al$ or to about 92% of the theoretical maximum density of a mixture of nickel and aluminum metal in a 3 to 1 atomic ratio. Isostatic pressing is a preferred method of forming preform 12 because preform 12 then can be formed into an intricate shape essentially identical to the shaped article.

Preform 12 then was positioned in die chamber 14 surrounded by a bed of graphite material 16, e.g., Superior Graphite 9400, a spherical powdered graphite available from Superior Graphite Co., Chicago, Ill. Superior Graphite 9400 has an average particle size of about 100 mesh (150 $\mu$m). The graphite particles can serve both as the pressure transmitting medium and as the electrical resistor for simultaneous heating and consolidation of preform 12 and the shaped article resulting therefrom.

A 45-ton post-and-platen press was used to compress the contents of die chamber 14 by means of rams 18 and 20. While applying pressure of at least about 500 psi, or up to the limits of the material of construction, to preform 12 and bed of graphite material 16, a power supply passed an electric current through rams 18 and 20 and bed of graphite material 16 by means of leads 22 and 24 to resistively heat preform 12 and the bed of graphite material 16. The temperature of preform 12 and bed of graphite material 16 within die chamber 14 was measured by a thermocouple (not shown).

In one embodiment, resistive heating of die chamber 14 and bed of electrically-conductive material 16 sufficiently raised the temperature of preform 12 to initiate the SHS reaction. In another embodiment, a lead 34 contacts an edge or a surface of preform 12. Lead 34 is resistively heated and the temperature of preform 12 at the surface or edge contacting lead 34 is raised sufficiently to initiate the SHS reaction. To initiate the SHS reaction between aluminum and nickel, preform 12, or an edge or surface thereof, is heated to about 630° C. to about 700° C. Chemical ignitors therefore are not necessary to initiate the SHS reaction.

Lead 34 can be, for example, a tungsten or Nichrome wire that is heated sufficiently to initiate the SHS reaction at an edge or surface of preform 12. After initiation of the SHS reaction, the exothermic heat of reaction was sufficient to propagate the reaction throughout the remainder of preform 12. An ignition wire, like lead 34, for initiating an SHS reaction in a pressurized reactor has been described by P. H. Shingu, in *New Ceramics* (Japan) 2 85 (1992). However, use of an ignition wire is inconvenient, and the ignition wire is damaged and must be replaced after each use. Preferably, the SHS reaction is initiated by sufficiently heating bed of electrically-conductive material 16 in the absence of a lead 34.

An added advantage of initiating the SHS reaction by heating the bed of electrically-conductive material 16 is that the entire preform is heated relatively slowly, thereby driving organic contaminants from the preform prior to initiation of the SHS reaction. The presence of organic contaminants during the SHS reaction can lead to formation of gaseous by-products that adversely affect the density of the shaped articles.

In accordance with another important embodiment of the present invention, preform 12 is positioned within the bed of electrically-conductive particles 16, or the bed of electrically-conductive particles 16 is arranged and compressed around preform 12, such that the SHS reaction is initiated at a predetermined surface or edge of preform 12. By initiating the SHS reaction at a predetermined site on preform 12, a hot reaction front, or zone, passes through preform 12. The hot reaction zone forces gaseous impurities from preform 12 as the reaction zone passes through preform 12 as a wave. The resulting shaped article typically has a greater density than a shaped article prepared by the method of the present invention wherein the SHS reaction is nonselectively initiated by heated graphite particles. To achieve the full advantage of the present invention, preform 12 is ignited at a predetermined site by the bed of electrically-conductive particles 16, as opposed to a lead 34 or a chemical ignitor.

Ignition of preform 12 at a predetermined site is accomplished by compacting the bed of electrically-conductive particles 16 such that the bed of electrically-conductive particles 16 is more compacted in the region where ignition is desired. Accordingly, current flow is higher in the more compacted region resulting in a higher temperature in the more compacted region compared to the other regions of the bed of electrically-conductive particles 16. Control of the compaction density can be accomplished, for example, by placement of preform 12 in the bed of electrically-conductive particles 16 such that the predetermined ignition point is closest to one ram; or, alternatively, by using an appropriate shape of one or both rams such that the degree of compaction within the bed of electrically-conductive particles 16 is not uniform and a higher compaction density results in the region of preform 12 where ignition of preform 12 is desired to occur.

The reaction between elemental nickel and elemental aluminum to provide nickel aluminide rapidly proceeds through preform 12 provided an appropriate balance exists between the heat released by the exothermic SHS reaction and (1) the heat used to raise the temperature of the unreacted elemental metallic components in preform 12, and (2) the heat lost to the surroundings of preform 12 and the bed of electrically-conductive particles 16 by conduction and radiation. If the rate of heat loss to the surroundings (e.g., die chamber 14) is too great, such as in the case of excessive conductive cooling of preform 12, the temperature of the elemental metallic components in preform 12 is reduced below the activation temperature for the reaction and the SHS reaction ceases. Preform 12 then is only partially converted from the starting elemental metallic components to the desired nickel aluminide.

Conversely, if the preform is thermally insulated, the exothermic heat released by the SHS reaction can be sufficient to raise the preform temperature above the melting point of preform 12. Although melting of preform 12 at the high temperature reaction front is desired to increase the density of the shaped article, complete melting of preform is not desirable. Complete melting of preform 12 may quench the reaction, alter the shape of preform 12, or cause electrically-conductive particles to imbed in a surface of the shaped article. Therefore, an SHS reaction is designed to control the temperature of preform 12 during the SHS reaction and to balance the exothermic heat of the reaction with the heat removal rate to achieve a desired rate of reaction and completely react the components in the preform.

The temperature of the SHS reaction conducted in consolidating reactor 10 is partially controlled by the bed of electrically-conductive material 16. During the SHS reaction, the bed of electrically-conductive material 16 helps control the exothermic SHS reaction by acting as a heat sink. If it is necessary to further control the exothermic SHS reaction to prevent melting preform 12 or the shaped article, a coolant can be introduced through port 26, cavity 32, and conduits 28. The coolant also can be used to cool the external surface of die chamber 14 by exiting cavity 32 through vents 30. The coolant typically is an inert gas, like argon, which is incapable of participating in an SHS reaction. Nitrogen is an unsuitable coolant because nitrogen is a reactant under SHS reaction conditions.

The bed of electrically-conductive material 16 also facilitates the controlled cooling of the shaped article. After completion of the SHS reaction, the heated bed of electrically-conductive material 16 allows the shaped article to cool slowly, thereby maintaining the integrity of the shape article. Typically, reaction products of SHS reactions are very hot, e.g., up to 4000° C. at the reaction front. Rapid cooling of the hot shaped article causes cracks that weaken the structural integrity of the shaped article. The bed of electrically-conductive material 16 provides controlled cooling of the hot shaped article to avoid cracks and maintain structural integrity of the shaped article.

In addition, the bed of electrically-conductive material 16 can be maintained at a high temperature after completion of the SHS to promote grain growth in the shaped article. Conversely, the bed of electrically-conductive material 16 can be subjected to accelerated cooling by passing an inert gas stream through the bed of electrically-conductive particles 16. Accelerated cooling inhibits grain growth, and therefore a fine grain structure in the shaped article is retained. In addition, after the SHS reaction is completed, the bed of electrically-conductive particles 16 and shaped article can be cooled to a predetermined temperature, then reheated to temper the shaped article.

In accordance with another important feature of the present invention, preform 12 can be compressed in consolidating reactor 10 either before, during or after preform 12 is ignited. Typically, compressing preform 12 prior to ignition does not further compress preform 12. Therefore, the SHS reaction generally is initiated when compression is initiated or shortly before compression is initiated. Preform 12 however, is compressed during the SHS reaction. Depending upon the compositional makeup of the shaped article, compression can be maintained after completion of the SHS reaction and during subsequent cooling and/or heating of the shaped article.

shaped article. The shaped article however has a desired net shape essentially identical to preform 12, and typically can be used for its intended purpose after removal from consolidating reactor 10 without performing any post-SHS reaction processing steps.

To illustrate the method of the present invention, various preforms comprising elemental nickel and aluminum were subjected to an SHS reaction at a high pressure and a high temperature in consolidating reactor 10. The preforms were reacted either in a one-inch diameter or a 1.7-inch diameter die chamber 14. In SHS reactions using the one-inch diameter die chamber, a pressure of about 2,000 to about 3,500 psi was applied to preform 12. The preforms were heated to maximum temperature (e.g., about 630° to about 205° C.) in about 10 minutes, and maintained at the maximum temperature for either 5, 10 or 20 minutes. Then, power to leads 22 and 24 was discontinued, and the pressure applied by rams 18 and 20 was released. The bed of electrically-conductive material 16 (graphite) and the resulting shaped article in die chamber 14 was allowed to cool. The results of the different reactions, and of the reaction conditions are summarized in Table 1.

TABLE 1

| | | | | | | | | | |
|---|---|---|---|---|---|---|---|---|---|
| EXAMPLE | COLD PRESSING | PROCESSING | DIE ID (in.) | TEMP (°C.) | TIME AT TEMP (min) | MAX PRESS (psi) | VOLUME CHANGE (%) | DENSITY (g/cm³) | Ni CONVERSION (%) | Ni—Al PHASES DETECTED |
| 1 | U | SHS | NA | — | <1 | 0 | + | — | 12 | NiAl, Ni₃Al |
| 2 | U | SHS | NA | — | −5 | 0 | + | — | 65 | Ni₃Al, NiAl |
| 3 | U | SHS | NA | — | — | 0 | +45 | — | — | — |
| 4 | I | SHS | NA | — | 2 | 0 | +60 | — | >95 | Ni₃Al |
| 5 | U | EC | 1.7 | — | — | 500 | −10 | — | — | — |
| 6 | U | EC | 1.7 | — | — | 1000 | −9 | 4.8 | — | — |
| 7 | U | EC | 1.7 | 699 | (a) | 2000(b) | −23 | 5.6 | <5 | Ni₃Al₂, NiAl, Ni₃Al |
| 8 | U | EC | 1.7 | 1029 | (a) | 3200(c) | −32(d) | 6.6(e) | >95 | Ni₃Al |
| 9 | I | EC | 1.7 | 632 | (a) | 2000 | +1 | 6.1 | >95 | Ni₃Al₂, NiAl, Ni₃Al |
| 10 | I | EC | 1.7 | 705 | (a) | 1500 | +2 | 6.2 | <5 | Ni₃Al₂, NiAl, Ni₃Al |
| 11 | I | EC | 1.7 | 904 | (a) | 3200 | +13 | 5.7 | 10 | NiAl, Ni₃Al |
| 12 | I | EC | 1.7 | 1029 | (a) | 3200(c) | +10 | 5.8 | 24 | NiAl, Ni₃Al |
| 13 | I | EC | 1.0 | 900 | 5 | 3400(c) | −1 | 6.3 | <5 | NiAl, Ni₃Al |
| 14 | I | EC | 1.0 | 1000 | 5 | 3300 | −10 | 6.7(e) | 16 | NiAl, Ni₃Al |
| 15 | I | EC | 1.0 | 1119 | 5 | 3300 | −9 | 7.2(e) | >95 | Ni₃Al(f) |
| 16 | I | EC | 1.0 | 1117 | 10 | 3400 | +4 | 6.8(e) | — | — |
| 17 | I | EC | 1.0 | 1113 | 10 | 3300 | −5 | 6.9(e) | >95 | Ni₃Al, NiAl(f) |
| 18 | I | EC | 1.0 | 1104 | 20 | 3400 | +2 | 6.7(e) | 48 | Ni₃Al, NiAl(f) |
| 19 | I | EC | 1.0 | 1205 | 5 | 2400 | +5 | 6.7(e) | 22 | Ni₃Al, NiAl |

(a)Temperature ramped to maximum temperature, then power discontinued.
(b)Maximum pressure not applied at maximum temperature: 2000 psi from 25° C.–664° C., then pressure reduced to 1500 psi from 664° C.–699° C.
(c)Maximum pressure not applied at maximum temperature: 400 psi from 25° C. - maximum temperature, pressure increased to 3200 psi and temperature decreased.
(d)Sample melted; volume reduction based on Archimedes' density.
(e)Archimedes' density.
(f)Unidentified Ni—Al phase.
(g)Abbreviations:
U = uniaxial
I = isostatic
SHS = SHS reaction only, no applied pressure
EC = SHS reaction and consolidation
NA = not applicable
ID = inside diameter
in. = inches
°C. = degree centigrade
min. = minutes
psi = pounds per square inch
g/cm³ = grams per cubic centimeter The shaped article resulting from the SHS reaction and simultaneous compression is essentially ready for use without the need for extensive machining. However, for some intermetallic compounds and ceramics, it is advantageous to subject the shaped article to a second heating step to ensure that the reaction is complete or to fix a particular physical property of the shaped article. In some cases, it may be necessary to buff or deburr the In particular, Table 1 summarizes the SHS reaction and consolidation parameters, the density and the phase analysis for the shaped articles of Examples 1–19. Examples 1–4 were included as comparative examples. In Examples 1–4, a standard SHS reaction was performed on a preform including a 3 to 1 atomic ratio of elemental nickel to elemental aluminum. The products of Examples 1–4 were not subjected to consolidation during the SHS reaction.

The shaped articles of Examples 5–19 were prepared by the method of the present invention, i.e., performing an SHS reaction in conjunction with consolidation. Like Examples 1–4, the preforms of Examples 5–19 included a 3 to 1 atomic ratio of nickel to aluminum. Examples 5–8 utilized uniaxially pressed preforms, and Examples 9–19 utilized isostatically pressed preforms.

The shaped articles of Examples 5–12 were prepared in a 1.7-inch diameter die chamber. When the 1.7-inch die chamber was used, it was difficult to sufficiently raise the temperature of preform 12 to initiate the SHS reaction. Therefore, the shaped articles of Examples 13–19 were prepared in a one-inch diameter die chamber. Examples 1–4 did not utilize a die chamber.

The density of the preforms and of the shaped articles of Examples 6 through 19, in terms of absolute density and as a percent of theoretical maximum density, are summarized in Table 2. For shaped articles wherein the volume decreased significantly during the SHS reaction and consolidation, the density was measured by a variation of Archimedes' method.

TABLE 2

Densities Before and After Processing

| | DENSITY OF PREFORM | | | DENSITY OF SHAPED ARTICLE | | |
|---|---|---|---|---|---|---|
| SAMPLE | (g/cm³) | % of Theo. Ni₃Al | % of Theo. 3Ni + 1Al | (g/cm³) | % of Theo. Ni₃Al | % of Theo. 3Ni + 1Al |
| 6 | 4.3 | 58 | 63 | 4.8 | 64 | 70 |
| 7 | 4.4 | 58 | 63 | 5.6 | 75 | 82 |
| 8 | 4.3 | 58 | 63 | 6.6(a) | 88 | 97 |
| 9 | 6.1 | 81 | 89 | 6.1 | 81 | 89 |
| 10 | 6.2 | 83 | 90 | 6.2 | 83 | 91 |
| 11 | 6.4 | 86 | 94 | 5.7 | 76 | 83 |
| 12 | 6.4 | 86 | 94 | 5.8 | 77 | 85 |
| 13 | 6.2 | 83 | 90 | 6.3 | 84 | 92 |
| 14 | 5.8 | 78 | 85 | 6.5 | 87 | 95 |
| | | | | 6.7(a) | 89 | 98 |
| 15 | 6.2 | 83 | 90 | 6.8 | 91 | 100 |
| | | | | 7.2(a) | 96 | 106 |
| 16 | 6.4 | 86 | 94 | 6.1 | 81 | 89 |
| | | | | 6.8(a) | 91 | 100 |
| 17 | 6.5 | 87 | 95 | 6.8 | 91 | 100 |
| | | | | 6.9(a) | 92 | 101 |
| 18 | 6.3 | 85 | 92 | 6.5 | 87 | 95 |
| | | | | 6.7(a) | 89 | 98 |
| 19 | 6.8 | 90 | 99 | 6.4 | 86 | 94 |
| | | | | 6.7(a) | 89 | 98 |

(a) Archimedes' density:

$$\frac{W_{dry}}{W_{sat} - W_{sus}} = \frac{W_{dry}}{V_s + V_c + V_o} = \text{bulk density,}$$

wherein $W_{dry}$ is weight of the dry sample in air, $W_{sat}$ is the weight of the water-impregnated sample suspended in water, $W_{sat}$ is the weight of the water-impregnated sample in air, $V_s$ is the volume of the sample, $V_c$ is the volume of closed pores, and $V_o$ is the volume of open pores.

Table 1 illustrates that several Ni—Al phases were detected in the shaped articles of Examples 1–19, including Ni₃Al, NiAl, Ni₂Al₃ and unidentified phases. Table 3 summarizes the melting point, crystal structure, and theoretical maximum density of various Ni—Al phases. The Ni—Al phases present in the shaped articles of Examples 1–19 were detected using standard

TABLE 3

Properties of Ni—Al Phases

| Phase | Aluminum Mole % | Crystal Structure | Melting Temperature (C.°) | Density (g/cm³) |
|---|---|---|---|---|
| Ni | 0 | cubic | 1455 | 8.90 |
| β-Ni₃Al | 25 | cubic | 1385 | 7.50 |

TABLE 3-continued

Properties of Ni—Al Phases

| Phase | Aluminum Mole % | Crystal Structure | Melting Temperature (C.°) | Density (g/cm³) |
|---|---|---|---|---|
| γ-NiAl | 50 | cubic | 1638 | 5.86 |
| δ-Ni₂Al₃ | 60 | hexagonal | 1133(a) | — |
| ε-NiAl₃ | 75 | — | 854(b) | — |
| Al | 100 | cubic | 660 | 2.70 |
| Al + 3Ni | 25 | — | — | 6.82 |

(a) Does not melt, but decomposes to aluminum-rich liquid phase and γ-NiAl.
(b) Does not melt, but decomposes to aluminum-rich liquid phase and δ-Ni₂Al₃.

techniques known to those skilled in the art, such as x-ray diffraction. The percent of nickel converted to Ni—Al phases was calculated from the x-ray data using a preform as a standard to provide a semiquantitative analysis of the phase composition.

The preforms of Examples 1–4 each were processed by a standard SHS method wherein a resistively-heated tungsten coil was used to initiate the SHS reaction by contacting an edge of the preform. The preform of Example 1 was simply reacted on an insulating block in an evacuated bell jar. The preforms of Examples 2–4 were positioned in a bed of graphite powder inside a graphite crucible then subjected to an SHS reaction. The shaped articles resulting from the SHS reaction of Examples 1–4 were extremely porous articles having a shape that only approximated the shape of the preform. The porosity of the shaped articles of Examples 1–4 was observed in scanning electron micrographs.

In addition, each of the shaped articles of Examples 1–4 expanded during the SHS reaction. A comparison of the large, positive-volume changes (e.g., up to 60% increase in volume) associated with shaped articles of Examples 1–4 to the low positive-volume to negative-volume changes in the shaped articles of Examples 5–19 illustrates that a simultaneous SHS reaction and consolidation promotes densification of the shaped article. With further respect to the shaped articles of Examples 1–4, only Example 4 used an isostatically-pressed preform and the shaped article of Example 4 exhibited more than a 95% conversion of nickel to nickel alumide (Ni₃Al). Therefore, it is theorized, but not relied upon herein, that an isostatically-pressed preform provides an enhanced propagation of the thermal wave because an isostatically-pressed preform is more dense than a uniaxially-pressed preform.

Uniaxially-pressed preforms reacted in the 1.7-inch diameter die chamber (Examples 5 through 8) were densified, whereas the isostatically-pressed preform samples (Examples 9 through 12) expanded slightly. At temperatures above 1000° C., the method of preparing the preform also affected the SHS reaction. The preform of Example 8, a uniaxially-pressed preform processed at 1029° C., exhibited a greater than 95% conversion to Ni₃Al, but a portion of the preform melted and formed an agglomerate with the graphite material surrounding the preform in the die. The agglomerate was examined by energy dispersive x-ray spectroscopy and found to include 64 atomic percent aluminum and 36 atomic percent nickel, thereby indicating a preferential depletion of aluminum from the preform. The x-ray pattern for the shaped article of Example 8 indicates that a small amount (<5%) of unreacted nickel was present. In contrast, the preform of Example 12, an isostatically-pressed sample processed under the same conditions as Example 8, underwent less than 25% conversion to $Ni_3Al$. The x-ray pattern for the shaped article of Example 12 shows primarily unreacted nickel with NiAl and $Ni_3Al$ phases.

The preforms of Examples 13-15 were reacted in a 1-inch diameter die chamber and were held at the reaction temperature for about 5 minutes at a nominal pressure of about 3,000 psi. The preforms reacted at 900° C. and 1000° C. (Examples 13 and 14) showed less than 20% conversion of elemental nickel to Ni—Al phases. The preform of Example 15 was processed at 1100° C. and showed significant conversion to Ni—Al phases, with less than 5% unreacted nickel. An x-ray pattern for the shaped article of Example 15 showed essentially all $Ni_3Al$, with a small amount of non-stoichiometric $\gamma 0NiAl$.

The length of time a preform is held at the maximum reaction temperature effects the density of the shaped article and the percent of nickel converted to a nickel aluminide. The preforms of Examples 15 through 18 were heated to a temperature of about 1100° C., and maintained at that temperature for about 5 to about 20 minutes. As discussed previously, nickel in the preform of Example 15 was more than 95% converted to Ni—Al phases. The preform of Example 17 also exhibited more than 95% conversion of nickel, but the preform of Example 18, which was maintained at the reaction temperature for the longest time showed only 48% nickel conversion. All shaped articles processed at 1100° C. contained non-stoichiometric $\gamma$-NiAl.

To further investigate the effect of high temperature on the density of the shaped article and amount of nickel conversion, the preform of Example 19 was processed at 1200° C. and 2000 psi. The shaped article of Example 19 exhibited a 5% volume increase and about 22% nickel conversion.

Although not relied on herein, the effects of time and temperature on the conversion rates of nickel to Ni—Al phases can be explained theoretically. The reaction between elemental nickel and elemental aluminum to form a nickel aluminide occurs at about 640° C. to about 700° C. Aluminum metal melts at 640° C. to 660° C. Therefore, during the SHS reaction, the aluminum melted and the molten aluminum was distributed throughout the preform, thereby coating the particles of nickel. Because the mean particle diameter of the nickel was rather large (87 $\mu m$) compared to the mean particle diameter of the aluminum (37 $\mu m$), the composition at the nickel-aluminum interface was rich in aluminum, resulting in the initial formation of $NiAl_3$ and then $Ni_3Al_2$, at temperatures up to about 700° C. At temperatures above about 700° C., increased interdiffusion of nickel and aluminum promoted the formation of NiAl. NiAl is stable and inhibits the formation of NiAl. The melting point of NiAl is several hundred degrees higher than the reaction temperatures, and it has been theorized that the formation of NiAl hindered the formation of $Ni_3Al$. The NiAl phase therefore consumes essentially all of the available aluminum but only one-third of the available nickel, and also acts as a diffusion barrier to the complete reaction of the elemental powders to NiAl.

Therefore, at reaction temperatures below about 1200° C., the reaction between NiAl and Ni to form $Ni_3Al$ proceeds through solid-state diffusional processes, which require relatively long reaction times. Accordingly, the five to twenty minutes that the preform was held at the reaction temperature was not sufficient to allow completion of the reaction. The use of metal particles having a relatively small average diameter, and the use of a faster heating rate, overcomes these problems.

In contrast to the preforms of Examples 1-4 the preforms of Examples 5-19 each were reacted using the heated bed of graphite material as an ignition source. Alternatively, an SHS reaction performed on a preform that is simultaneously reacted and compressed can be initiated by contacting a surface or an edge of the preform with a resistively-heated tungsten or Nichrome wire. The wire is heated to a sufficient temperature to initiate the SHS reaction and the graphite material is used to consolidate the preform and maintain the reaction temperature.

To further demonstrate the present invention, an intricately-shaped article was prepared. The intricately-shaped article was a hexagonal-headed bolt which was suitable for use after the SHS reaction and consolidation without the need for post-SHS reaction and consolidation processing steps. Two types of bolts were prepared. One type of bolt was about 1 in. (inch) in length and about ⅛ in. in diameter and having about 30 threads per inch. The second type of bolt, a nickel aluminide bolt about 1¾ in. (inches) in length and in. in diameter, and having about 20 threads per inch, was prepared as follows:

A powdered precursor including intimately admixed elemental nickel (176.13 g, 99.7% purity, 3 $\mu m$ average particle size) and elemental aluminum (26.98 g, 99.5% purity, minus 325 mesh (44 micron)), in a 3 to 1 atomic ratio of nickel to aluminum, was prepared by blending the elemental powders in a Patterson-Kelly V-type blender for 24 hours. The powdered precursor was added to natural rubber molds having the shape of a hexagonal bolt and having dimensions of 3 in. in length and ⅛ in. in diameter. About 9 g of the powdered precursor was used in the preparation of a bolt. No additives, such as pressing aids, were added to the powdered precursor or to the mold.

The filled molds were vibrated to settle and pack the powdered precursor, then the rubber molds were sealed at the open end. The rubber molds containing the powdered precursor then were isostatically pressed in a "wet-bag" type of cold isostatic press up to about 55,000 psi. After isostatic pressing, the resulting preforms were removed from the natural rubber molds. The preforms had a high relative density compared to the powdered precursor (e.g., about 80% of the theoretical maximum density of $Ni_3Al$), and had sufficient structural integrity for handling without breakage. The preform had a dimension of about 1.44 in. in length and 0.306 in. in diameter.

The preforms were positioned in a cylindrical graphite die of 6 in. OD (outer diameter) and 2½ in. ID (inner diameter). The die was fitted with an internal graphite liner of ¼ in. thickness, thereby providing an actual die ID of 2 in. The height of the die was 8 in. A graphite ram (2 in. in diameter and 3 in. in length) was inserted into the bottom open end of the cylindrical die and the electrically-conductive and pressure-transmitting material (Superior Graphite Grade 9400) was poured into the die to partially fill the die chamber. The bolt-shaped preforms, up to five in number, then were placed in the die chamber in a vertical position and covered entirely with electrically-conductive graphite material. Another graphite ram, also 2 in. in diameter, was inserted into the upper open end of the die and electrical contact was made to the graphite rams by means of water-cooled copper plates attached to the upper and lower platens of a hydraulic press apparatus.

To prevent electrical current from flowing through the wall of the graphite die and the graphite liner, exposed surfaces, as well as the outer surfaces of the rams, were coated with a paint containing colloidal boron nitride. The paint served as an electrical insulator material which allowed current to flow only from the ram face in contact with the graphite and through the graphite.

A pressure of between about 1,500 to about 4,000 psi was applied to the rams by the hydraulic press. The pressure was maintained during the entire heating period, SHS reaction, and consolidation. Power then was applied by a rectified DC power supply, and the current flow through the electrically-conductive graphite material was controlled at a constant level of about 2,000 to about 5,000 amperes, and preferably about 4,000 amperes. The voltage dropped from an initial voltage of about 7.0 to 7.5 volts to a final voltage of about 4.2 to 4.5 volts, while maintaining current flow constant during the SHS reaction and consolidation.

After a time period of about 4 to about 15 minutes, the applied power was discontinued, and the die was allowed to cool. After cooling, the hexagonal bolts were removed from the bed of graphite. The bolt was suitable for use in a practical application without the need for post-reaction and consolidation processing steps, like grinding or deburring. Analyses of the hexagonal bolts by x-ray diffraction showed essentially complete conversion of the powdered precursor into the $Ni_3Al$ intermetallic compound.

The data summarized in Table 4 illustrate the conditions used in the manufacture of hexagonal bolts in accordance with the present invention.

TABLE 4

| | Reaction Conditions and Measured Densities of Nickel Aluminide Bolts | | | | | |
|---|---|---|---|---|---|---|
| Bolt Run No. | Period[a] (min) | Pressure (psi) | Current (amps) | Voltage Average (volts) | Final Density | |
| | | | | | g/cc | % Theo. |
| 1 | 15 | 2,500 | 4000 | 4.9 | 6.495 | 86.6 |
| 2 | 15 | 3,250 | 4000 | 4.4 | 6.398 | 85.3 |
| 3 | 9 | 3,000 | 4500 | 4.7 | 6.398 | 85.3 |

[a]Time power applied, minutes
[b]Theoretical maximum density of $Ni_3Al$ is 7.5 g/cc The densities of the $Ni_3Al$ bolts listed in Table 4 are less than the theoretical maximum density. However, these measured densities represent substantial shrinkage (e.g., about 15 to about 16%) in the actual volume of the preform as a result of the simultaneous SHS and consolidation method. A judicious selection of processing conditions, such as increased time, higher power input and higher applied pressure, enable manufacture of shaped articles having a density close in value to the maximum theoretical density. For example, in other experiments using cylindrical preforms, shaped articles of about 95 percent of maximum theoretical density were prepared.

Obviously many modifications and variations of the invention as hereinbefore set forth can be made without departing from the spirit and the thereof, and therefore only such limitations should be imposed as are indicated by the appended claims.

What is claimed:

1. A method of manufacturing a shaped article comprising:
   a) admixing solid components capable of undergoing a self-propagating high-temperature synthesis reaction to form a powdered precursor;
   b) compressing the powdered precursor to form a preform having a density of at least about 30% of theoretical maximum density and having a shape of the shaped article;
   (c) positioning the preform in a bed of electrically-conductive particles such that the preform is surrounded by the electrically-conductive particles; and
   (d) heating the preform and the bed of electrically-conductive particles to a sufficient temperature and for a sufficient time to initiate and sustain the self-propagating high-temperature synthesis reaction while simultaneously pressurizing the preform and the bed of electrically-conductive particles to provide the shaped article, said shaped article having a different compositional makeup than the powdered precursor, having a density of at least 80% of theoretical maximum density, and having a net shape substantially identical to the preform
   wherein the shaped article can be used for its intended purpose without a post-reaction processing step.

2. The method of claim 1 further comprising introducing a liquid or gaseous component to the preform in the bed of electrically-conductive particles, which particles are graphite prior to or during step (d).

3. The method of claim 1 wherein the shaped article comprises an intermetallic compound, a ceramic, cermet or a ceramic/ceramic microcomposite.

4. The method of claim 3 wherein the intermetallic compound is a metallic aluminide comprising aluminum and a transition metal selected from the group consisting of scandium, titanium, vanadium, chromium, manganese, iron, cobalt, nickel, zirconium, niobium, molybdenum, hafnium, tantalum, cerium, tungsten, neodymium, praseodymium, lanthanum, thorium and uranium.

5. The method of claim 4 wherein the intermetallic compound is a nickel aluminide having the formula $Ni_3Al$.

6. The method of claim 3 wherein the ceramic is a carbide, a boride, a carbonitride, a silicide, a chalcogenide, a nitride, a niobiate, a tantalate, or an oxide superconductor.

7. The method of claim 1 wherein the solid components of the powdered precursor each has a mean particle diameter of about 0.1 to about 100 microns, and wherein a ratio of mean particle diameters between any two solid components is about 0.1 to 1.

8. The method of claim 1 wherein the powdered precursor is compressed uniaxially.

9. The method of claim 1 wherein the powdered precursor is compressed isostatically.

10. The method of claim 1 wherein the electrically-conductive particles are spheroidal, free flowing granules and have an average particle size of about 50 to about 500 microns and a melting point greater than 2000° C.

11. The method of claim 1 wherein the electrically-conductive particles have an electrical resistivity of about $2 \times 10^{-2}$ to about $20 \times 10^{-2}$ ohm-cm.

12. The method of claim 1 wherein the electrically-conductive particles have a resiliency of at least 20%.

13. The method of claim 1 wherein the electrically-conductive particles are selected from the group consisting of graphite, a carbide, a boride, a nitride, a carbonitride and mixtures thereof.

14. The method of claim 13 wherein the electrically-conductive particles are selected from the group consisting of graphite, silicon carbide, boron carbide, boron nitride and mixtures thereof.

15. The method of claim 1 wherein the electrically-conductive particles are graphite particles coated with a carbide, a boride, a nitride or a carbonitride.

16. The method of claim 1 wherein the self-propagating high-temperature synthesis reaction is initiated by heating the bed of electrically-conductive particles to at least the activation temperature of the self-propagating high-temperature synthesis reaction.

17. The method of claim 1 wherein the preform and bed of electrically-conductive particles are resistively heated in step (d).

18. The method of claim 1 wherein the self-propagating high-temperature synthesis reaction is initiated at a predetermined site on the preform.

19. The method of claim 18 wherein the self-propagating synthesis reaction is initiated at the predetermined site on the preform by increasing the compaction density of the bed of electrically-conductive particles at the predetermined site of the preform relative to the compaction density of the bed of electrically-conductive particles contacting the remainder of the preform.

20. The method of claim 1 wherein the self-propagating high-temperature synthesis reaction is initiated by contacting the preform with a resistively-heated ignition wire.

21. The method of claim 1 further comprising:
(e) cooling the shaped article and the bed of electrically-conductive particles sufficiently slowly to prevent the formation of cracks in the shaped article.

22. The method of claim 1 wherein the shaped article is heated at a sufficient temperature and for a sufficient time after completion of the self-propagating high-temperature synthesis reaction to promote grain growth in the shaped article.

23. The method of claim 1 wherein the shaped article comprises nickel aluminide having the formula $Ni_3Al$; the powdered precursor is nickel metal and aluminum metal in a 3 to 1 atomic ratio of nickel to aluminum; the bed of electrically-conductive particles comprises graphite; and the preform and bed of graphite particles are heated to a temperature of about 630° C. to about 1200° C. for a sufficient time to initiate and sustain the self-propagating high-temperature synthesis reaction while subjecting the preform and bed of graphite particles to a pressure of at leash about 500 psi.

24. A method of manufacturing a shaped article comprising nickel aluminide, said method comprising the steps of:
(a) admixing particles of nickel metal and particles of aluminum metal in a 3 to 1 atomic ratio of nickel metal to aluminum metal to form a powdered precursor,
(b) compressing the powdered precursor to form a preform having a density of at least about 30% of theoretical maximum density and having a shape of the shaped article;
(c) positioning the preform in a bed of electrically-conductive particles such that the preform is surrounded by electrically-conductive particles; and
(d) heating the preform and the bed of electrically-conductive particles to about 630° C. to about 1200° C. and for a sufficient time to initiate a self-propagating high-temperature synthesis reaction at a predetermined site on the preform while simultaneously exerting a pressure of at least about 500 psi on the preform and the bed of electrically-conductive particles to provide the shaped article, said shaped article having a density of at least 80% of the theoretical maximum density of nickel aluminide, and having a net shape substantially identical to the preform
wherein the shaped article can be used for its intended purpose without a post-reaction processing step.

25. The method of claim 24 wherein the electrically-conductive particles comprise graphite.

26. A shaped article prepared by a method comprising:
a) admixing solid components capable of undergoing a self-propagating high-temperature synthesis reaction to form a powdered precursor;
(b) compressing the powdered precursor no form a preform having a density of at least about 30% of theoretical maximum density and having a net shape of the shaped article;
(c) positioning the preform in a bed of electrically-conducive particles such that the preform is surrounded by graphite particles; and
d) heating the preform and the bed of electrically-conductive particles to a sufficient temperature and for a sufficient time to initiate and sustain the self-propagating high-temperature synthesis reaction while simultaneously pressurizing the preform and the bed of electrically-conductive particles to provide the shaped article, said shaped article having a different compositional makeup than the powdered precursor, having a density of at least 80% of theoretical maximum density, and having a net shape substantially identical to the preform
wherein the shaped article can be used for its intended purpose without a post-reaction processing step.

27. The shaped article of claim 26 wherein the electrically-conductive particles comprise graphite.

28. The shaped article of claim 26 comprising a nickel aluminide.

29. The method of claim 1 wherein the solid components of the powdered precursor each has a mean particle diameter of about 0.1 to 100 microns, and wherein a ratio of mean particle diameters between any tow solid components is about 10 to 1.

* * * * *

UNITED STATES PATENT AND TRADEMARK OFFICE
CERTIFICATE OF CORRECTION

PATENT NO. : 5,382,405                    Page 1 of 2

DATED : January 17, 1995

INVENTOR(S) : Kenneth F. Lowrance, II, et al.

It is certified that error appears in the above-identified patent and that said Letters Patent is hereby corrected as shown below:

Column 4, line 5, "when" should be --then--

Column 4, line 37, "mullire" should be --mullite--

Column 4, line 49, "post reaction" should be -- post-reaction --

Column 7, line 46, "mullire" should be --mullite--

Column 7, line 51, "mullire" should be --mullite--

Column 8, line 16, "De" should be --be--

Column 11, line 49, "an" should be --can--

Column 11, line 51, "two" should be --to--

Column 16, line 14, between "to" and "maximum" insert --a--

Column 16, line 15, "205°C" should be --1205°C--

Columns 15, 16, Table I, line beginning with "2," column headed "Time at Temp (min)," "-5" should be --~5--

Column 19, line 15, "γ0NiAl" should be --γ-NiAl--

Column 20, line 24, "1 3/4" should be --1 1/4--

Column 20, line 24, between "and" and "in." insert --1/4--

Column 20, line 54, "0D" should be --OD--

UNITED STATES PATENT AND TRADEMARK OFFICE
CERTIFICATE OF CORRECTION

PATENT NO. : 5,382,405

DATED : January 17, 1995

INVENTOR(S) : Kenneth F. Lowrance, II, et al.

It is certified that error appears in the above-identified patent and that said Letters Patent is hereby corrected as shown below:

Column 23, line 57, "leash" should be --least--

Column 24, line 32, "no" should be --to--

Column 24, line 60, "tow" should be --two--

Signed and Sealed this

Twenty-fifth Day of April, 1995

Attest:

BRUCE LEHMAN

*Attesting Officer*     *Commissioner of Patents and Trademarks*